United States Patent
Chang et al.

(10) Patent No.: US 6,456,697 B1
(45) Date of Patent: Sep. 24, 2002

(54) DEVICE AND METHOD OF CHANNEL EFFECT COMPENSATION FOR TELEPHONE SPEECH RECOGNITION

(75) Inventors: Sen-Chia Chang, Changhua Hsien; Shih-Chieh Chien, Taichung Hsien, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/394,191

(22) Filed: Sep. 10, 1999

(30) Foreign Application Priority Data

Sep. 23, 1998 (TW) .......................................... 87115808

(51) Int. Cl.[7] .......................... H04M 1/64; H04M 3/42; H04M 1/00

(52) U.S. Cl. ................................ 379/88.01; 379/88.07; 379/201.01; 379/406.01; 379/406.1; 379/88.03

(58) Field of Search ........................... 379/88.01–88.05, 379/88.07, 201.01, 201.02, 406.01–406.03, 340, 347; 704/233, 234, 251, 275, 232, 242, 245, 246, 250, 255

(56) References Cited

U.S. PATENT DOCUMENTS

| | | | | |
|---|---|---|---|---|
| 4,975,961 A | * | 12/1990 | Sakoe | 381/43 |
| 5,675,704 A | * | 10/1997 | Juang et al. | 395/2.25 |
| 5,677,990 A | * | 10/1997 | Junqua | 395/2.64 |
| 5,692,040 A | * | 11/1997 | Greenblatt | 379/350 |
| 5,699,487 A | * | 12/1997 | Richardson | 395/22 |
| 5,727,124 A | * | 3/1998 | Lee et al. | 395/2.42 |
| 5,812,972 A | * | 9/1998 | Juang et al. | 704/234 |
| 5,839,103 A | * | 11/1998 | Mammone et al. | 704/232 |

OTHER PUBLICATIONS

Hermansky et al., "RASTA Processing of Speech," *IEEE Transactions on Speech and Audio Processing*, vol. 2, No. 4, pp. 578–289 (1994).

Liu et al., "Efficient Cepstral Normalization for Robust Speech Recognition," *Proc. of Human Language Technology*, pp. 69–74 (1993).

Rahim et al., "Signal Bias Removal by Maximum Likelihood Estimation for Robust Telephone Speech Recognition," *IEEE Transactions on Speech and Audio Processing*, vol. 4, No. 1, pp. 19–30 (1996).

Lee et al., "Application of Fully Recurrent Neural Networks for Speech Recognition," *Proceeding of ICASSP91*, pp. 77–80 (1991).

Chou et al., "Segmental GPD Training of HMM Based Speech Recognizer," *Proceeding of ICASSP92*, pp. I–473 to I–476 (1992).

Chang et al., "An RNN–Based Compensation Method for Mandarin Telephone Speech Recognition," *5th International Conference on Spoken Language Processing* (1998).

* cited by examiner

*Primary Examiner*—Allan Hoosain
(74) *Attorney, Agent, or Firm*—Ladas & Parry

(57) ABSTRACT

Device and method of channel effect compensation for a telephone speech recognition system is disclosed. The telephone speech recognition system comprises a compensatory neutral network and a recognize. The compensatory neural network receives an input signal and compensates the input signal with a bias to generate an output signal. The compensatory neural network provides a plurality of first parameters to determine the bias. The recognizer is coupled to the compensatory neural network for classifying the output signal according to a plurality of second parameters in acoustic models to generate a recognition result and determine a recognition loss. The first parameters and second parameters are adjusted according to the recognition loss and an adjustment means during a training process.

21 Claims, 5 Drawing Sheets

DEVICE AND METHOD OF CHANNEL EFFECT COMPENSATION FOR TELEPHONE SPEECH RECOGNITION

BACKGROUND OF THE INVENTION

1. Field of the invention

The present invention generally relates to a telephone speech recognition system. More particularly, the present invention relates to device and method of channel effect compensation for telephone speech recognition.

2. Description of the Related Art

In a speech recognition application via a telephone network, speech signals are Inputted from the handset of a telephone and transmitted through a telephone line to a remote speech recognition system for recognition. Therein, the path speech signals pass includes the telephone handset and the telephone line, which are referred to as a "telephone channel or channel". In terms of signal transmission, the characteristic of the telephone channel will affect the speech signals during transmission, referred as a "telephone channel effect or channel effect". Mathematically, impulse response of the telephone channel is introduced with a convolved component into speech signals.

FIG. 1 is a diagram illustrating a typical telephone speech recognition system. As shown in the FIG. 1, a speech signal $x(t)$ sent by the calling part becomes a telephone speech signal $y(t)$ after passing through the telephone channel 1 comprising the telephone handset and the telephone line, and is inputted to the recognition system 10 for further processing. The recognition result R is generated by the recognition system 10. Here, assume the impulse response of the telephone channel 10 to be $h(t)$, then the relationship between the speech signal $x(t)$ and the telephone speech signal $y(t)$ can be represented by:

$$y(t)=x(t) \otimes h(t) \quad (1)$$

where symbol "$\otimes$" represents the convolution operator. Most importantly, the impulse response $h(t)$ in the telephone channel 1 varies with the caller's handset and the transmits son path of speech signals in a telephone network (the transmission path determined by switching equipment). In other words, the same phone call (the same speech signal $x(t)$) will generate different telephone speech signals $y(t)$ through different telephone channels (different impulse responses $h(t)$. This environmental variation will affect the recognition ate of the recognition system 10. Therefore, compensation of telephone channel effect should be performed before undergoing telephone speech recognition to reduce such environmental variation.

The principle of typical telephone channel effect compensation will be briefly described in the following. Equation (1) represents the relationship between the speech signal $x(t)$ and the telephone speech signal $y(t)$ in time domain. If equation (1) is transformed to the spectral domain, then it can be represented by:

$$Y(f)=X(f) \cdot |H(f)|^2 \quad (2)$$

where $X(f)$ and $Y(f)$ represent the power spectra of the speech signal $x(t)$ and the telephone speech signal $y(t)$, respectively, and $H(f)$ represents the transfer function of the telephone channel 1.

The following logarithm spectral relation is obtained after processing the bilateral logarithms of equation (2):

$$\log[Y(f)]=\log[X(f)]+\log[|H(f)|^2] \quad (3)$$

The following will be obtained when inverse Fourier transformation Is used for projecting equation (3) on a cepstral domain:

$$c_y(\tau)=c_x(\tau)+c_h(\tau) \quad (4)$$

where $c_x(\tau)$, $c_y(\tau)$, and $c_h(\tau)$ are the respective cepstral vectors of $x(t)$, $y(t)$, and $h(t)$.

From equations (3) and 4), in logarithmic spectral and cepstral domain, the influence of the telephone channel upon the speech signals in transmission can be described with a bias. Therefore, most of the current telephone channel effect compensation means are developed and based upon such a principle. The difference lies in the bias estimation method and bias elimination method.

FIG. 2 is a block diagram illustrating a conventional telephone speech recognition system. As shown in the figure, the telephone speech recognition system comprises a feature analysis section 100, a channel effect compensation section 102 and a recognizer 104 (comprising a speech recognition section 104a for speech recognition and acoustic models 104b feature analysis section 100 first blocks the received telephone speech signal $y(t)$ into frames, performs feature analysis on each telephone speech frame, and generates a corresponding feature vector $o(t)$. in accordance with the description of the above equations (3) and (4), the feature vector $o(t)$ may be a logarithmic spectral vector or a cepstral vector. Channel effect compensation section 102 subsequently performs compensation of the feature vector $o(t)$, and the generated feature vector $ô(t)$ is inputted to the recognizer 104. Speech recognition section 104a performs the actual speech recognition according to the acoustic models 104b and generates the desired recognition result R. The three most popular telephone channel effect compensation techniques are the following: the relative spectral technique (RASTA), the cepstral mean normalization (CMN), and the signal bias removal (SBR) . The first technique adopts a fixed filter type, whereas the last two techniques calculate the bias from feature vectors of a telephone speech signal. These conventional techniques will be briefly described in the following references, the content of which is expressly incorporated herein by reference.

(A) RASTA: Refer H. Hermansky, N. Morgan, "RASTA processing of speech" HEEE Trans. On Speech and Audio Processing, vol. 2, pp.578–589, 1994 for derails. The operation of RASTA makes use of filters Go eliminate low-frequency components contained in the logarithmic spectral vectors or cepstral vectors, that is, the bias introduced by the telephone channel, for the purpose of the channel effect compensation. According to aforementioned analysis, bandpass infinite impulse response (IIR) filters expressed by the following equation (5) can perform quite well.

$$H(z) = 0{:}1 \times \frac{1+z^{-1}-z^{-3}-2z^{-4}}{z^{-4}(1-0.98z^{-1})} \quad (5)$$

The purposes of using a bandpass filter are twofold: firstly, for filtering out the bias by highpass filtering; and secondly, for smoothing the rapidly changing spectra by lowpass filtering. If only the telephone channel effect compensation is considered, only highpass filtering need be used. At this time, the transfer function of the highpass filter can be represented as follows:

$$H(z) = \frac{1 - z^{-1}}{1 - (1-\lambda)z^{-1}} \quad (6)$$

RASTA has demonstrated its advantage in that it can be easily realized without causing response time delay problems, however, its disadvantage is that the range of the frequency band of the filter is predetermined and cannot be adjusted with the inputted telephone speech signal. Therefore, some useful speech information may be also deleted when the bias introduced by the telephone channel effect is filtered out; the recognition result will then be affected. As a result, the recognition result of a telephone speech recognition system obtained with RASTA compensation method is less effective than those obtained by CMN and SBR compensation methods.

(B) CMN : Refer F. Liu, R. M. Stern, X. Huang and A. Acero, "Efficient cepstral normalization for robust speech recognition," Proc. Of Human Language Technology, pp.69–74, 1993 for details. The operation of CMN is to estimate the bias representing the characteristic of the telephone channel and to eliminate the bias from the logarithmic spectral vectors or cepstral vectors of the telephone speech signal. In CMN, a bias is represented by the cepstral mean vector of telephone speech signals. Since the bias is estimated from telephone speech signals, the telephone channel characteristic can be acquired and a better compensation can be obtained. However, CMN is performed by assuming the cepstral mean vector of the speech signal before passing the telephone channel to be a zero vector. Experimental results have demonstrated that such an assumption is valid when the input speech signals are long enough. But, when the speech signals are rot long enough, the phonetic information or the speech signals will affect the estimation of the bias; thus, the compensation result is rot significant.

(C) SBR: Refer M. G. Rahim and B. H. Hwang, "Signal bias removal by maximum likelihood estimation for robust telephone speech recognition," IEEE Trans. Speech and Audio Processing, vol. 4, pp. 19–30, 1996 for details. The SBR algorithm estimates the bias in an iterative manner based upon the maximum likelihood criterion. Similarly, the compensated logarithmic spectral vectors or cepstral vectors can be obtained by subtracting the estimated bias from the logarithmic spectral vectors or cepstral vectors of telephone speech signals in an iterative manner. In contrast to the CMN, the SBR algorithm can estimate the bias more accurately; however, the response time delay for recognition prolongs comparatIvely. Further, since the SBR algorithm is a technique based upon the maximum likelihood criterion, the estimation error of maximum likelihood may also affect the accuracy of the estimation of the bias when the telephone speech signals are not long enough.

The above-mentioned three telephone channel effect compensation techniques share a common drawback in that accurate results will not be achieved when the telephone speech signals are not long enough. Moreover, these techniques merely deal with the feature vectors without considering the connection with speech recognizers.

SUMMARY OF INVENTION

The object of the present invention is to provide device and method of channel effect compensation, to accurately estimate the bias representing the characteristic of the telephone channel.

According to the above object, the present invention provides device and method of channel effect compensation for telephone speech recognition. The channel effect compensation device comprises:

a compensatory neural network for receiving an input signal and compensating the input signal with a bias to generate an output signal, wherein the compensatory neural network provide a plurality of first parameters to determine the bias.

During a training process, a feedback section could be coupled to the compensatory neural network for adjusting the first parameters according to the error between the bias and a target function.

During the other training process, a recognizer could be coupled to the compensatory neural network, with a speech recognition section for classifying the output signal according to a plurality of second parameters in acoustic models to generate a recognition result and determine a recognition loss thereby; and an adjustment section coupled to the compensatory neural network and the recognizer for adjusting the first parameters and the second parameters according to the recognition loss determined by the recognition result and an adjustment means.

Also, a method of compensating an Input signal in a telephone speech recognition system, comprises the following steps of:

receiving the input signal by a compensatory neural network; determlnlng a bias in response to a plurality of first parameters provided by the compensatory neural network; compensating the input signal with the bias; and sending out the compensated input signal to be an output signal.

During a training process, the training process comprising the steps of: receiving a plurality of feature vectors of a training telephone speech signal by the compensatory neural network; generating a bias in response to the first parameters provided by the compensatory neural network, the bias representing the characteristic of the telephone channel; comparing the bias with a target function to generate an error; and adjusting the first parameters by an error back-propagation algorithm according to a minimum mean square error criteria.

Wherein, the first parameters are determined during a training process, the training process comprising the steps of: receiving a plurality of feature vectors of a training telephone speech signal by the compensatory neural network; generating a bias in response to the first parameters provided by the compensatory neural network, the bias representing the characteristic of the telephone channel; compensating the feature vectors with the bias to generate a plurality of compensated feature vectors; classifying the compensated feature vectors in response to a plurality of second parameters in acoustic models by a speech recognition section to generate a recognition result; determining a recognition loss in response to the recognition result; and adjusting the first and second parameters according to the recognition loss and an adjustment means.

DETAILED DESCRIPTION OF THE PREFERRED EMBODIMENTS

Several embodiments of this invention will be described in detail with the accompanying drawings as follows.

First Embodiment

Figure 1:
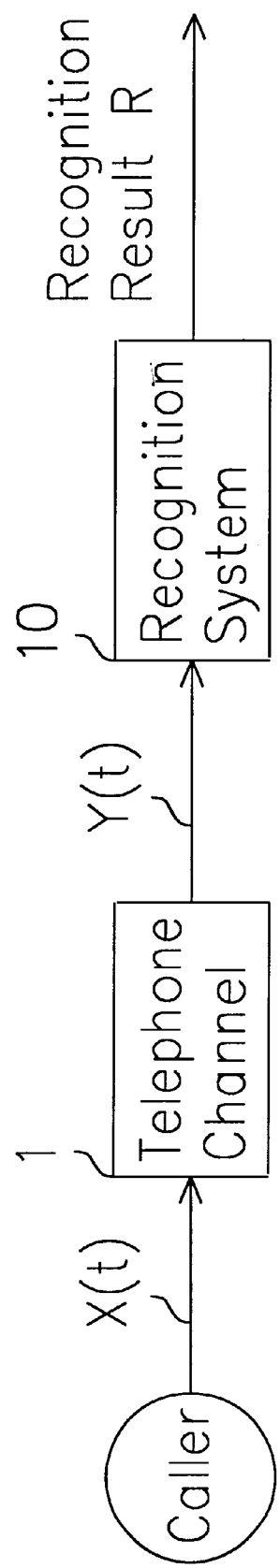
FIG. 1 is a block diagram illustrating a telephone speech recognition system.
Figure 2:
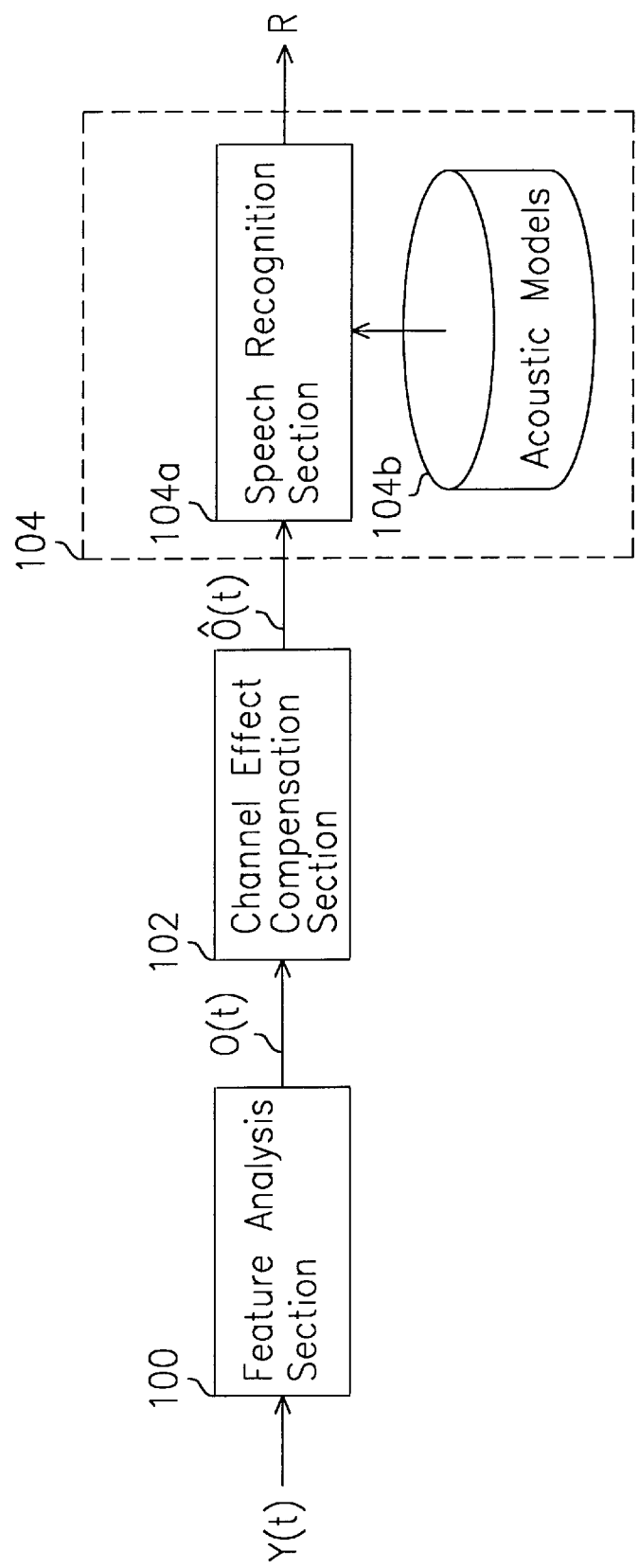
FIG. 2 is a block diagram illustrating a related telephone speech recognition system.
Figure 3:
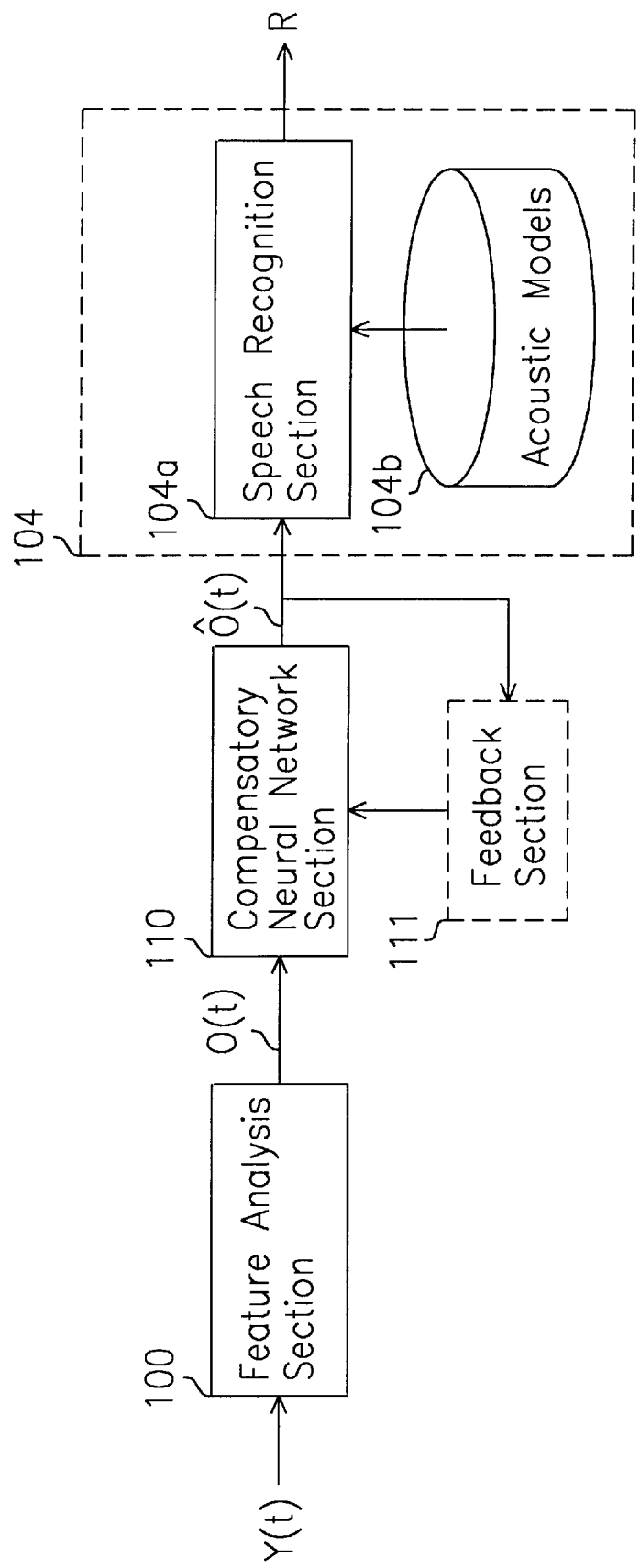
FIG. 3 is a block diagram illustrating a first embodiment of device and method of channel effect compensation of the telephone speech recognition system of the present invention.

FIG. 3 is a block diagram illustrating the first embodiment of device and method of channel effect compensation of the telephone speech recognition system of the present invention, wherein the parts different than hose of the related system in FIG. 2 are indicated with a different numeral. As shown in the figure, the compensatory neural network 110 in the first embodiment replaces the channel effect compensation section 102 of the related system.

Compensatory neural network 110 is used for estimating the bias that represents the characteristic of the telephone channel and removing the bias from an input signal, such a bias being determined by the first parameters (for example, offsets of neurons and weights between neurons). A feedback section 111 is utilized during the training process to adjust the first parameters according to the error between the bias and a target function.

In this embodiment, the input layer and the output layer of the compensatory neural network 110 have D neurons, respectively, representing the D-dimensional feature vector o(t) of the telephone speech signal and the estimated bias b(t) at the corresponding time, and t=1, 2, ... , a, where T represents the number of speech frames of the telephone speech signal. There may be one hidden layer or more hidden layers between the input layer and the output layer.

Assume at each time t, the error e(t) between an estimated bias b(t) and the actual bias B can be represented as:

$$e(t)=b(t)-B \quad (7)$$

According to minimum mean square error (EASE) criteria, the estimate of the actual bias B, $\overline{B}$ is an average value of b(t), namely:

$$\overline{B} = \frac{1}{T}\sum_{t=1}^{T} b(t) \quad (8)$$

Thus, the compensated feature vector ô(t) can be represented as:

$$ô(t)=F(o(t);\theta)=o(t)-\overline{B} \quad (9)$$

where function F(•) represents the compensatory function for the compensatory neural network 110, and θ is the parameter set of the compensatory neural network 110, comprising the offsets of neurons and weights between neurons in the compensatory neural network.

According to equations (7) and (8), the smaller the error between B and $\overline{B}$, the more accurate the estimated bias. To achieve this objective, the error back-propagation algorithm is adopted to train the neural network by making use of minimum mean square error as criteria. Refer S. J. Lee, K. C. Kim, H. Yoon, and J. W. Cho, "Application of Fully Recurrent Neural Networks for Speech Recognition," Proceeding of ICASSP91, pp. 77–80, 1991 for details of the aforementioned training process. In the training process of this embodiment, two requirements have yet to be met. First, the target function of the training process has to be the actual bias that represents the characteristic of the telephone channel. Though the actual bias couldn't be obtained, the target function could be set to be the average of feature vectors of all telephone speech signals uttered within a telephone call and would approach to the actual bias. Second, the feedback section 111 of FIG. 3 has to adjust the first parameters of the compensatory neural network 110 according to the back-propagation error at every predetermined time interval. According to the above-mentioned two requirements for training the neural network, the compensatory neural network 110 can accurately estimate the bias of the telephone speech signal.

Second Embodiment

In the first embodiment described above, the compensatory neural network and recognizer are separate devices; that is, compensation of telephone channel effect is performed independently by the compensatory neural network. However, the present invention demonstrates its advantage in that the compensatory neural network can be integrated with subsequent recognizer to be an integrated recognition framework; that is, adjusting the first parameters of the compensatory neural network and the second parameters of the recognizer through the same mechanism to improve the recognition rate. This embodiment will be described in further detail with the accompanying drawings as follows.

Figure 4:
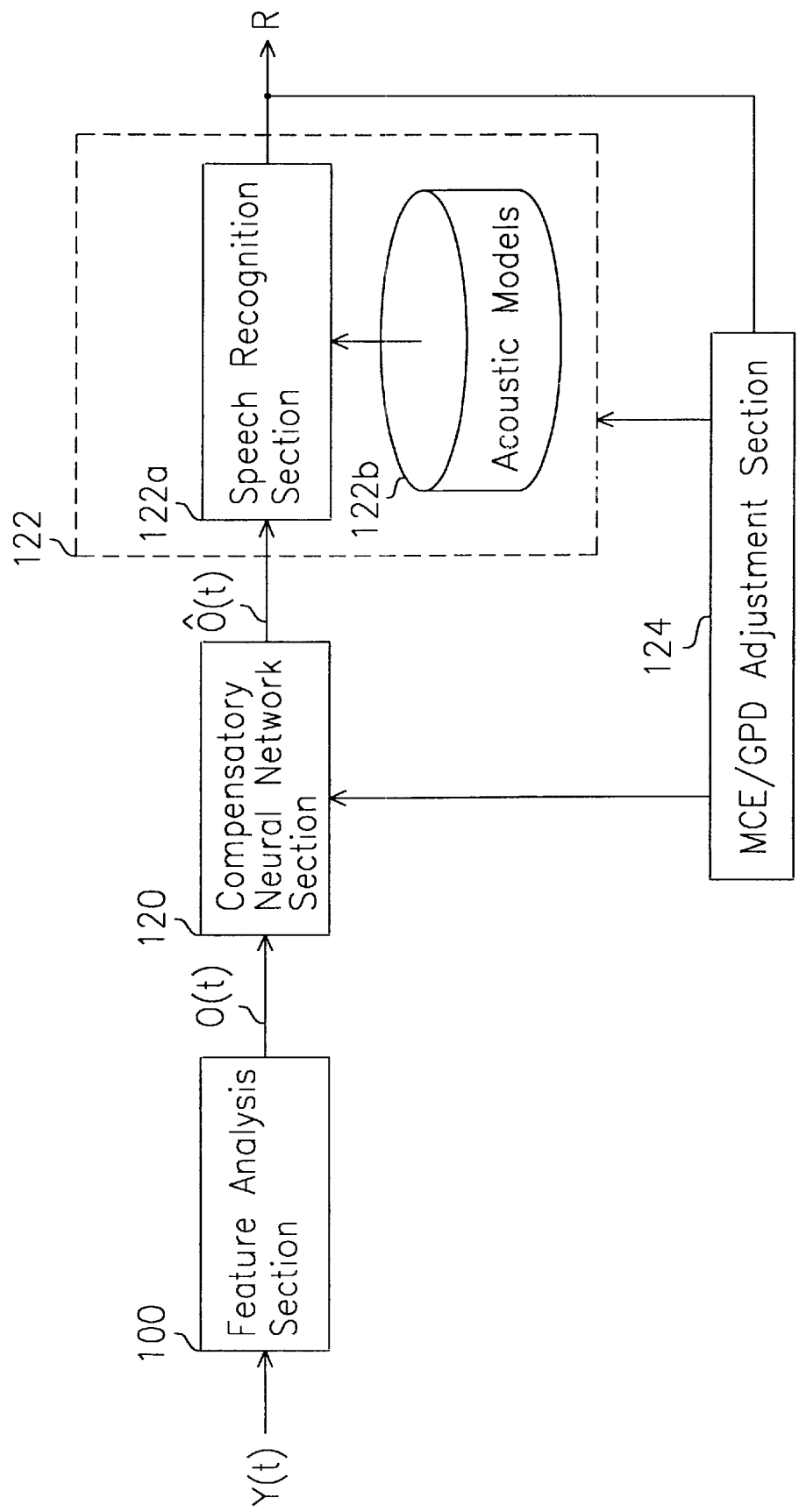
FIG. 4 is a block diagram illustrating a second embodiment of device and method of channel effect compensation of the telephone speech recognition system of the present invention.

FIG. 4 is a block diagram illustrating the second embodiment of device and method of channel effect compensation of the telephone speech recognition system of the present invention, wherein the parts different than those of the first embodiment in FIG. 3 are indicated with a different numeral. As shown in the FIG. 4, in the training process, the second embodiment adjusts the related parameters (such as the offsets and weights) of the compensatory neural network 120 and the related parameters (such as mean vectors and covariance matrices of Gaussian distributions of HMMs) of the acoustic models 122b of the recognizer 22 through the adjustment section 124 based upon the recognition result R. In this embodiment, the compensatory neural network 120 may use the framework of the first embodiment; therefore, the description is omitted. The speech recognition section 122a performs speech recognition according to the output feature vectors of the compensatory neural network 120 and thus generates a result R. The adjustment section 124 adopts minimum classification error (MCE) as the training criteria, and generalized probabilistic descent (GPD) (W. Chou, B. H. Juang, and C. H. Lee, "Segmental GPD Training of HMM-Based speech Recognizer," Proceeding of ICASSP92, pp. I-473–I-476, 1992) as the training method.

Figure 5:
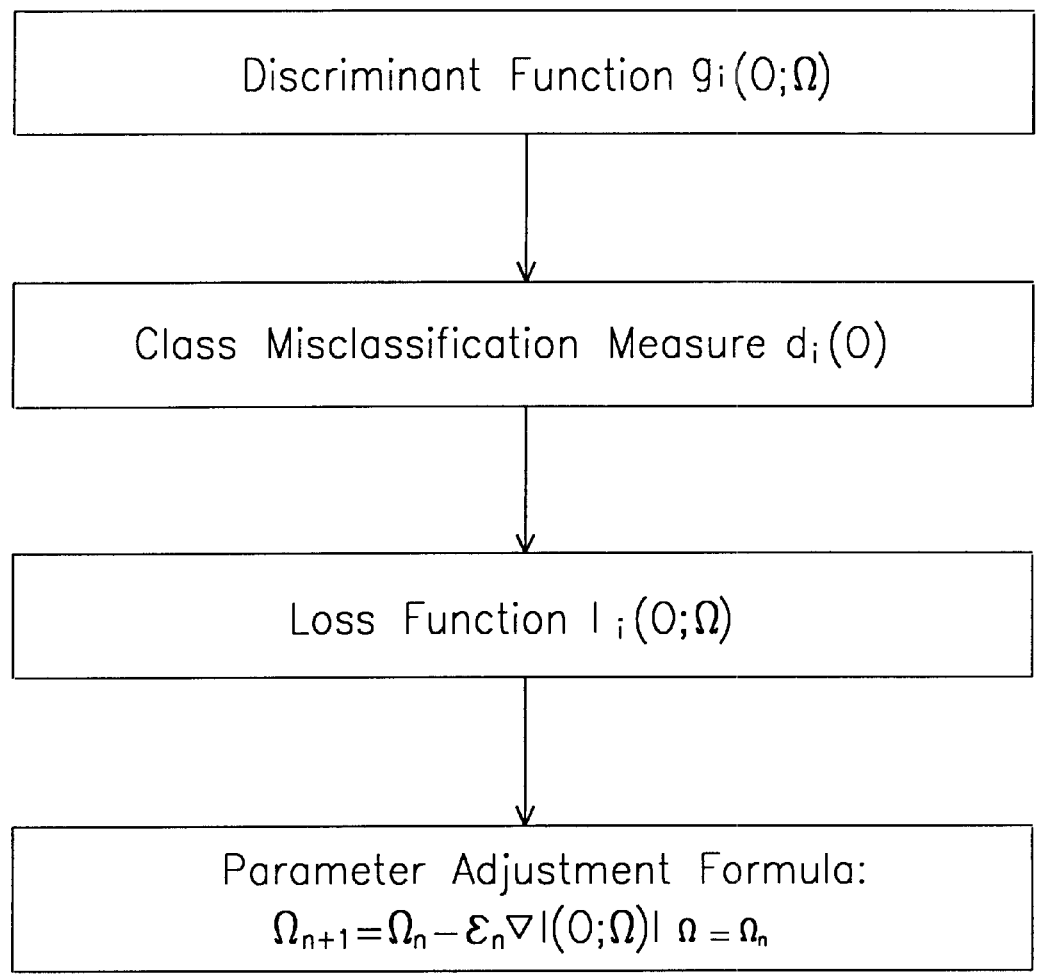
FIG. 5 is a flowchart illustrating the operations between the recognizer and adjustment section of the second embodiment in accordance with the present invention.

In this embodiment, the parameter set Λ of the recognizer 122 and the parameter set θ of the compensatory neural network 120 together are regarded as the overall parameter set Ω={Λ'θ}. FIG. 5 is a flowchart representing the operation of various functions among the compensatory neural network 120, the recognizer 122 and MCE/PD adjustment section 124 of this embodiment, namely: the discriminant function $g_i(O;\Omega)$, class misclassification measured (O), loss function $l_i(O;\Omega)$, and parameter adjustment formula, respectively. The various functions and formula will be described as follows.

First, assume there are M (M is a positive integer) words (or classes) to be recognized, marked respectively as $C_i$, i=1, 2, ..., M. And $g_i(O;\Omega)$ (i=1, 2, ..., M) is a set of discriminant functions defined by the parameter set $\Omega$, where $$O = \{o(t)\}_{t=1}^T$$

represents a sequence of feature vectors, such as cepstral vectors or logarithm spectral vectors, before passing through the compensatory neural network 120. The recognizer is performed according to the following decision rule:

$$C(O) = C_l \text{ if } g_l(O; \Omega) = \max_j g_j(O; \Omega) \quad j = 1, 2, \ldots, M \quad (10)$$

where (•) is a function representing the integrated recognition framework.

A class misclassification measure $d_i(O)$ is defined as:

$$d_i(O) = -g_i(O; \Omega) + \log\left\{\left[\frac{1}{M-1}\sum_{j, j\neq i} \exp[g_j(O; \Omega)\eta]\right]^{1/\eta}\right\} \quad (11)$$

$$= -g_i(O; \Omega) + G_i(O; \Omega)$$

where $\eta$ is a positive number. Class misclassification measure $d_i(O)$ is a function of the parameter set $\Lambda$ of the recognizer 122 and the parameter set $\theta$ of the compensatory neural network 120. If a class misclassification measure $d_i(O)$ is embedded in a smoothed zero-one function, then the corresponding loss function $l_i(O;\Omega)$ can be defined as:

$$l_i(O;\Omega) = l(d_i(O)) \quad (12)$$

where I(•) is a sigmoid function, generally represented as:

$$l(d) = \frac{1}{1 + \exp(-\alpha d + \beta)} \quad (13)$$

where $\alpha$ and $\beta$ are respective parameters of this function, $\beta$ is normally set to 0, and d represents $d_i(O)$. In terms of an unknown feature vector series O, the recognition loss can be represented as:

$$l(O; \Omega) = \sum_{i=1}^M l_i(O; \Omega) I(O \in C_i) \quad (14)$$

where $I(O \in C_i)$ is an indication function to indicate whether feature vector series O belongs to a particular class $C_i$.

The expected error L(O) for a type of recognition problems can be defined as:

$$L(O) = E_O\{l(O;\Omega)\} = \sum_{i=1}^M \int_{O \in C_i} l_i(O;\Omega) p(O) dO \quad (15)$$

Currently, there are a number of minimization algorithms for minimizing the expected error. In this embodiment, the minimization algorithm's implemented by means of generalized probabilistic descent to reduce the expected error L(O) by an iterative procedure, as depicted in W. Chou, B. H. Juang, and C. H. Lee, "Segmental GPD Training of HMM-Based speech Recognizer," Proceeding of ICASSP92, pp. I-473–I-476, 1992. Furthermore, in this embodiment, both the parameter set $\Lambda$ of recognizer 122 and the parameter set $\theta$ of the compensatory neural network 120 are adjusted through the same adjustment means. The adjustment means for the parameter set $\Omega$ is then:

$$\Omega_{n+1} = \Omega_n - \epsilon_n \nabla 1(O;\Omega)|_{\Omega=\Omega_n} \quad (16)$$

where $\epsilon_n$ is a learning rate.

Thus, all parameters can be adjusted according to equation (16) for reducing the expected error. For example, the weights w of the compensatory neural network may be adjusted in this manner, that is, $$w_{n+1} = w_n - \epsilon_n \frac{\partial l_i(O;\Omega)}{\partial w}\bigg|_{\Omega=\Omega_n} \quad (17)$$

where $$\frac{\partial l_i(O;\Omega)}{\partial w} = \frac{\partial l(d_i(O))}{\partial d_i} \cdot \frac{\partial d_i(O)}{\partial w}$$

$$= \alpha l(d_i(O))(1 - l(d_i(O)))\left[\frac{\partial G_i(O;\Omega)}{\partial w} - \frac{\partial g_i(O;\Omega)}{\partial w}\right]$$

In addition, the above discriminant function $g_i(O;\Omega)$ can be determined according to the framework of the recognizer. For example, when the hidden Markov model based recognizer is used, the discriminant function $g_i(O;\Omega)$ may be defined as the likelihood function; whereas if the dynamic time warping (DTW) is adopted, then the discriminant function $g_i(O;\Omega)$ is a distance function.

Experimental Results

Experiments on a speaker-independent Mandarin polysyllabic word recognition task are performed to examine effectiveness of the mentioned embodiments. In experiments, the number of words Go be recognized is 1038. A telephone speech database collected from 362 speakers is used for experiments. 7674 utterances uttered by 292 speakers are used for training. 1892 utterances uttered by the other 70 speakers are used for testing. All telephone speech signals are sampled at a rate of 8KHz and pre-emphasized with a digital filter, 1–0.95$^{-1}$. It is then analyzed for each Hamming-windowed frame of 20 ms with 10 ms frame shift. The feature vector consists of 12 mel-cepstral coefficients, 12 delta mel-cepstral coefficients, the delta energy, and he delta-delta energy.

The HMM-based speech recognizer employed 138 sub-syllable models as basic recognition units, including 100 3-state right-context-dependent INITIAL models and 38 5-state context-independent FINAL models. The observation distribution for each state of the HMM is modeled by a multivariate Gaussian mixture distribution. The number of mixture components in each state varies from one to ten depending on tie amount of training data. For silence, a single-state model with ten mixtures is used.

The compensatory neural network is a recurrent neural network (RNN) with a three-layer architecture; namely, an input layer, a hidden layer and an output layer. As described In the first embodiment, when the telephone channel effect compensation is performed independently by he compensatory neural network, the setting of the target function is a very important factor in training stage. In this embodiment, the target function is sea to be the same for all speech signals recorded from a telephone call. For example, $O_1^s, O_2^s, \ldots, O_{30}^s$ are feature vector series of 30 utterances spoken by the speaker S within a telephone call. When the input of the compensatory neural network is anyone of these feature vector series, then the target function may be set as:

$$B = \frac{\sum_{i=1}^{30}\sum_{t=1}^{T_i} o_i^S(t)}{\sum_{i=1}^{30} T_i} \quad (18)$$

where $T_i$ represents the number of speech frame of the $i^{th}$ utterance. Error-back-propagation, algorithm is carried out to adjust parameters of the compensatory neural network. And this algorithm is performed on "one-utterance one back-propagation" basis.

Table 1 is a list of the recognition rates of the baseline system (no channel effect compensation), three compensation systems of the related art (RASTA, CMN, SBR), the first embodiment and the second embodiment.

TABLE 1

| COMPENSATION METHOD | RECOGNITION RATE (%) | ERROR REDUCTION RATE (%) |
| --- | --- | --- |
| Baseline system | 87.1 | — |
| RASTA | 87.7 | 4.7 |
| CMN | 87.8 | 5.4 |
| SBR | 88.0 | 7.0 |
| The first embodiment | 88.9 | 14.0 |
| The second embodiment | 89.8 | 20.9 |

From Table 1, it can be seen that the recognition rate can be effectively improved with the use of the first embodiment or the second embodiment. However, the preferred recognition result will be obtained in the second embodiment.

Although the present invention has been described in its preferred embodiments, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A channel effect compensation device of a telephone speech recognition system for compensating an input signal, said channel effect compensation device comprising:
   a compensatory neural network for receiving said input signal and compensating said input signal with a bias to generate an output signal, wherein said compensatory neural network provides a plurality of first parameters to determine said bias, and wherein said input signal is a logarithmic spectral vector series corresponding to a plurality of telephone speech frames.

2. The channel effect compensation device of claim 1, wherein said first parameters comprise offsets of plural neurons in said compensatory neural network, and weights between said neurons.

3. The channel effect compensation device of claim 1, further comprising a feedback section coupled to said compensatory neural network for adjusting said first parameters according to the error between the bias and a target function during a training process.

4. The channel effect compensation device of claim 3, wherein said target function is set as:

$$B = \frac{\sum_{n=1}^{N}\sum_{t=1}^{T_n} o_n^S(t)}{\sum_{n=1}^{N} T_n}$$

where B represents said target function, N is the number of utterances uttered by speaker S within a telephone call, $T_n$ is the number of telephone speech frames of the $n^{th}$ utterance, and $o_n^s(t)$ the feature vector of the th telephone speech frame of the $n^{th}$ utterance.

5. The channel effect compensation device of claim 3, wherein during said training process an error back-propagation algorithm is used to adjust said first parameters according to a minimum mean square error criteria.

6. The channel effect compensation device of claim 1, further comprising:
   a recognizer coupled to said compensatory neural network, with a speech recognition section for classifying said output signal according to a plurality of second parameters in acoustic models to generate a recognition result and determine a recognition loss thereby; and
   an adjustment section coupled to said compensatory neural network and said recognizer for adjusting said first parameters and said second parameters according to said recognition loss determined by said recognition result and an adjustment means during a training process.

7. The channel effect compensation device of claim 6, wherein said second parameters are a plurality of mean vectors and a plurality of covariance matrices of Gaussian distributions of hidden Markov models in said acoustic models of said recognizer.

8. The channel effect compensation device of claim 6, wherein said adjustment means for adjusting said first parameters and said second parameters is generalized probabilistic descent.

9. A method of compensating an input signal in a telephone speech recognition system, comprising the following steps of:
   receiving said input signal by a compensatory neural network;
   determining a bias in response to a plurality of first parameters provided by said compensatory neural network;
   compensating said input signal with said bias; and
   sending out said compensated input signal to be an output signal, wherein said input signal is a logarithmic spectral vector series corresponding to a plurality of telephone speech frames.

10. The method of claim 9, wherein sad first parameters comprise offsets of plural neurons in said compensatory neural network, and weights between said neurons.

11. The method of claim 9, wherein said first parameters are determined during a training process, said training process comprising the steps of:
   receiving a plurality of feature vectors of a training telephone speech signal by said compensatory neural network;
   generating a bias in response to said first parameters provided by said compensatory neural network, said bias representing the characteristic of said telephone channel;
   comparing said bas with a target function to generate an error; and adjusting said first parameters by an error back-propagation algorithm according to a minimum mean square error criteria.

12. The method of claim 9, wherein first parameters are determined during a training process, said training process comprising the steps of:

receiving a plurality of feature vectors of a training speech signal by said compensatory neural network;

generating a bias in response to said first parameters provided by said compensatory neural network, said bias representing the characteristic of said telephone channel;

compensating said feature vectors with said bias to generate a plurality of compensated feature vectors;

classifying said compensated feature vectors in response to a plurality of second parameters in acoustic models by a speech recognition section to generate a recognition result;

determining a recognition loss in response to said recognition result; and adjusting said first and second parameters according to said recognition loss and an adjustment means.

13. The method of claim 12, wherein said second parameters are a plurality of mean vectors and a plurality of covariance matrices of Gaussian distributions of hidden Markov models in said acoustic models.

14. The method of claim 12, wherein said adjustment means for adjusting said first parameters and said second parameters is generalized probabilistic descent.

15. A channel effect compensation device of a telephone speech recognition system for compensating an input signal, said channel effect compensation device comprising:

a compensatory neural network for receiving said input signal and compensating said input signal with a bias to generate an output signal, wherein said compensatory neural network provides a plurality of first parameters to determine said bias; and a feedback section coupled to said compensatory neural network for adjusting said first parameters according to the error between the bias and a target function during a training process, wherein said target function is set as:

$$B = \frac{\sum_{n=1}^{N} \sum_{t=1}^{T_n} o_n^s(t)}{\sum_{n=1}^{N} T_n}$$

wherein B represents said target function, N is the number of utterances uttered by speaker S within a telephone call, $T_n$ is the number of telephone speech frames of the $n^{th}$ utterance, and $o_n^s(t)$ is the feature vector of the $t^{th}$ telephone speech frame of the nth utterance.

16. The channel effect compensation device of claim 15, wherein during said training process an error back-propagation algorithm is used to adjust said first parameters according to a minimum mean square error criteria.

17. A method of compensating an input signal in a telephone speech recognition system, comprising the following steps of:

receiving said input signal by a compensatory neural network;

determining a bias in response to a plurality of first parameters provided by said compensatory neural network;

compensating said input signal with said bias; and sending out said compensated input signal to be an output signal;

wherein said first parameters are determined during a training process, said training process comprising the steps of:

receiving a plurality of feature vectors of a training telephone speech signal by said compensatory neural network;

generating a bias in response to said first parameters provided by said compensatory neural network, said bias representing the characteristic of said telephone channel;

comparing said bias with a target function to generate an error; and adjusting said first parameters by an error back-propagation algorithm according to a minimum mean square error criteria.

18. The method according to claim 15, wherein said input signal is a cepstral vector series corresponding to a plurality of telephone speech frames.

19. A method of compensating an input signal in a telephone speech recognition system, comprising the following steps of:

receiving said input signal by a compensatory neural network;

determining a bias in response to a plurality of first parameters provided by said compensatory neural network;

compensating said input signal with said bias; and sending out said compensated input signal to be an output signal;

wherein said first parameters are determined during a training process, said training process comprising the steps of:

receiving a plurality of feature vectors of a training telephone speech signal by said compensatory neural network;

generating a bias in response to said first parameters provided by said compensatory neural network, said bias representing the characteristic of said telephone channel;

compensating said feature vectors with said bias to generate a plurality of compensated feature vectors;

classifying said compensated feature vectors in response to a plurality of second parameters in acoustic models by a speech recognition section to generate a recognition result;

determining a recognition loss in response to said recognition result;; and adjusting said first and second parameters according to said recognition loss and an adjustment means.

20. The method of claim 19, wherein said second parameters are a plurality of mean vectors and a plurality of covariance matrices of Gaussian distributions of hidden Markov models in said acoustic models.

21. The method of claim 19, wherein said adjustment means for adjusting said first parameters and said second parameters is generalized probabilistic descent.

* * * * *